Sept. 25, 1956          L. J. ULRICH          2,763,927

PLOW ATTACHMENT FOR ROTARY CUTTING MACHINES

Filed Oct. 25, 1955          2 Sheets—Sheet 1

INVENTOR
Lester J. Ulrich
BY
Parker, Prochnow & Haynes
Attorneys.

Sept. 25, 1956 L. J. ULRICH 2,763,927
PLOW ATTACHMENT FOR ROTARY CUTTING MACHINES
Filed Oct. 25, 1955 2 Sheets-Sheet 2

United States Patent Office 2,763,927
Patented Sept. 25, 1956

2,763,927
PLOW ATTACHMENT FOR ROTARY CUTTING MACHINES

Lester J. Ulrich, Buffalo, N. Y., assignor to Eastman Machine Company, Buffalo, N. Y.

Application October 25, 1955, Serial No. 542,580

2 Claims. (Cl. 30—273)

This invention relates to cutting machines of the type commonly used for cutting cloth and other flexible sheet material. The improvements constituting the subject matter of this invention are particularly directed to machines of this type employing circular knives.

These machines are frequently used in connection with cutting spongy materials such, for example, as foam or sponge rubber. When cutting this type of material with a rotary type cutting machine, the material has a tendency to adhere to the sides of the knife, which causes it to pack down where it contacts with the sides of the knife. This distorts the normal flat plane of the upper surface of the material and makes it impossible to cut a perpendicular edge. This type of material due to its tendency to adhere to the knife, causes the knife to pull the material towards itself, which may stall the motor, or if the motor is powerful enough, the knife will cut the material in a jerky, intermittent manner which produces a ragged edge.

Attempts have been made to overcome this condition by lubricating the sides of the knife. While, in some cases this helps, yet in general the material wipes the lubricant off the knife as fast as it can be applied, so that it is only partially effective. Furthermore, in most cases, it is not permissible from the standpoint of the user of the machine to use lubricant on the material being cut.

Consequently, it is one object of this invention to provide a machine of this kind with means for moving the material out of contact with the knife immediately after the knife has cut the material. It is also an object to provide the machine with thin shields or deflectors on both sides of the knife adjacent the portion thereof which enters the material so as to deflect the material away from the knife immediately after it is cut, thus providing a minimum of contact of the material with the sides of the knife.

A further object is to provide means for efficiently mounting shields or deflectors of this type on stationary parts of the cutting machine without requiring any major changes in machines of this type as heretofore constructed.

Other objects and advantages will be apparent from the following description of one embodiment of the invention and the novel features will be particularly pointed out hereinafter in connection with the appended claims.

Figure 1:
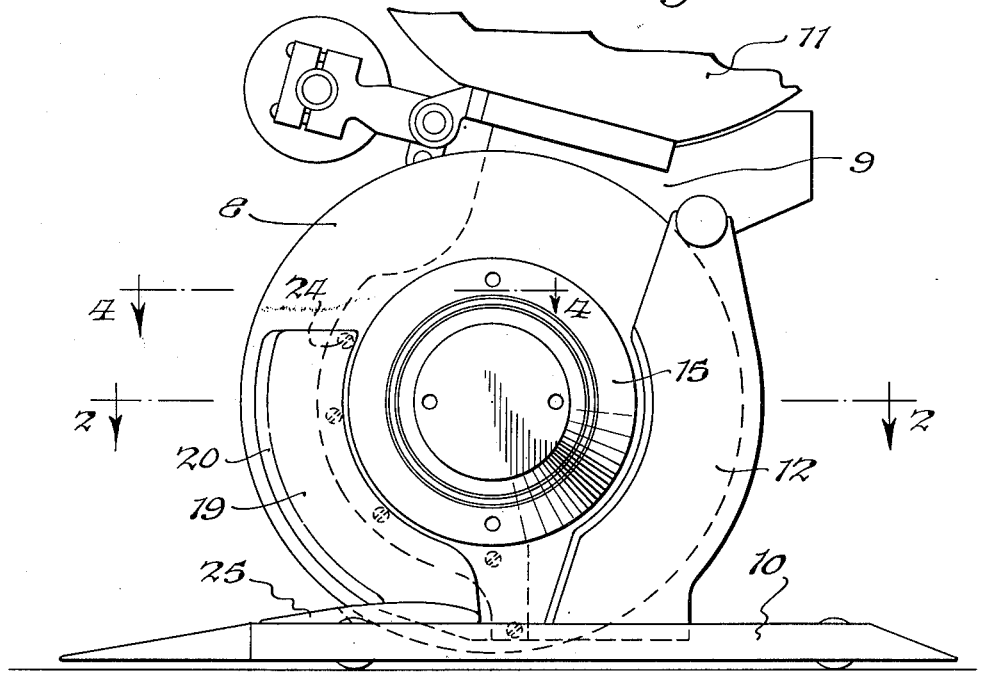
Fig. 1 is a fragmentary side elevation of a cutting machine provided with sheet deflecting members embodying this invention.

The cutting machine shown by way of example in the accompanying drawings includes the usual circular rotary knife 8 mounted on a standard 9 which is secured to and extends upwardly from a base plate 10 of usual construction which is mounted on suitable rollers and adapted to move over the surface of a table or support on which the material to be cut lies and underneath the material. This standard supports a motor, not shown, arranged in a motor frame or housing 11, partly shown in Fig. 1, and it also forms a mounting for the rotary knife 8. 12, Fig. 1, represents the usual side guard for the knife.

Figure 2:
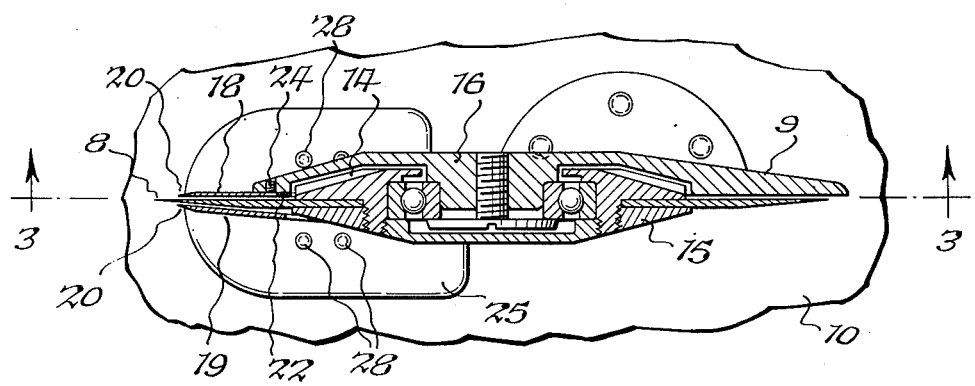
Fig. 2 is a sectional plan view thereof, on line 2—2, Fig. 1.

The knife shown in Fig. 2 is mounted for rotation on the standard 9 in the usual manner, the knife being clamped between one side of the gear 14 and a clamping nut 15 which has a threaded engagement with a correspondingly threaded flange of the gear 14. This gear is mounted by means of suitable bearings upon a hub 16 forming a part of the standard 9, ball bearings being shown in the construction illustrated.

In accordance with my invention, I provide a pair of plows or deflecting members 18 and 19 on the machine at opposite sides of that portion of the knife which enters the material to be cut. These plows or deflecting members, as clearly shown in Fig. 2, are made of relatively thin material and have their front or leading ends curved to correspond to the curvature of the knife. The front edges of these members are tapered, as shown at 20, and extend within a short distance of the edge of the knife. These deflecting members extend inwardly from the base plate of the machine and their upper ends extend above the upper surface of any material that may be cut by the machine. Thus, it will be obvious that after the knife 8 has entered a short distance into the material to be cut, this material will contact with the leading edges of the deflecting plates 18 and 19, with the result that the material will be deflected toward opposite sides away from the knife 8 in such a manner that only a small part of the knife contacts with the material which has been cut, the plows or deflecting members spreading part of the material which has just been cut laterally away from the knife.

Figure 3:
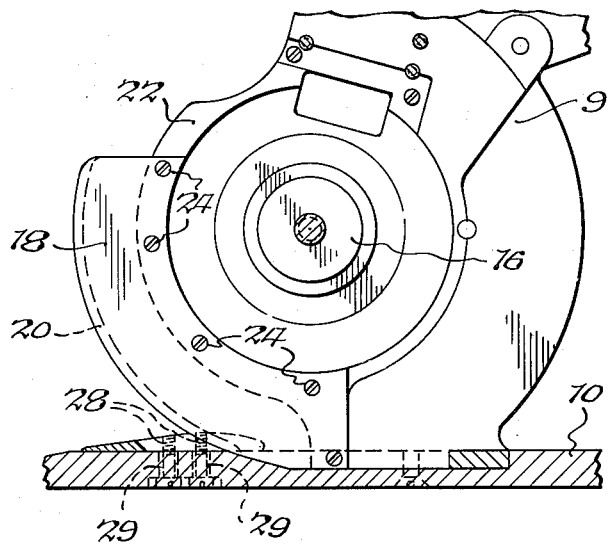
Fig. 3 is a sectional elevation thereof, on line 3—3, Fig. 2.

The deflecting member or plow 18 is preferably in the form of an arc-shaped plate which is attached to the frame member 9, so as to extend forwardly therefrom in close proximity to the knife. For this purpose in the construction shown by way of example, the forwardly extending curved portion of the standard 9 is provided with a flat surface 22 to which the inner edge of the deflector plate 18 is suitably secured, for example, by means of screws 24. Preferably as shown in Fig. 3, the lower end of the deflecting member or plow 18 extends downwardly into an upwardly facing slot or recess in the base plate 10 in which recess the standard is also secured.

Figure 4:
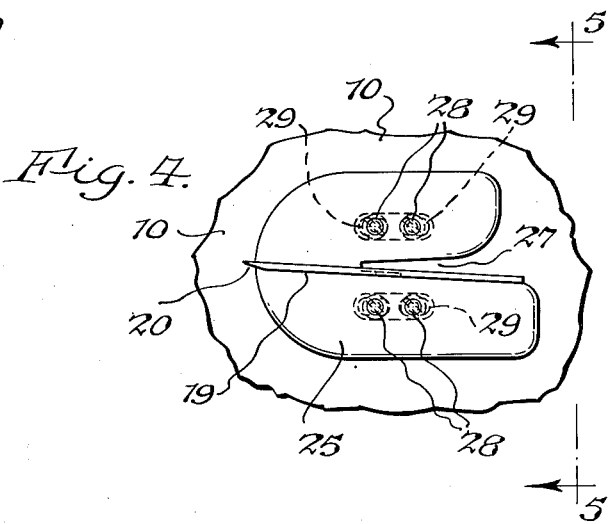
Fig. 4 is a fragmentary, top plan view thereof, approximately as seen on line 4—4, Fig. 1.
Figure 5:
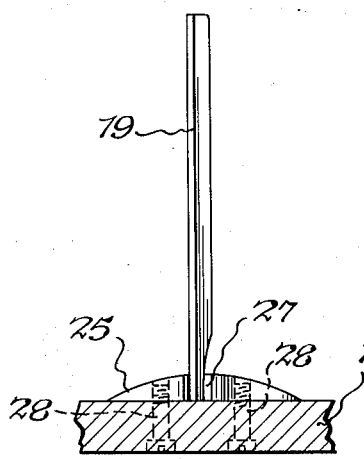
Fig. 5 is a fragmentary elevation thereof, as seen on line 5—5, Fig. 4.

The other plow or deflector member 19 is suitably secured to the usual throat plate 25 of the machine. The throat plate has a slot or recess 27 as shown in Fig. 4 into which the knife extends and the lower end of this deflector plate may be welded or otherwise secured to the throat plate at one side of this slot and extends upwardly therefrom. This deflector plate is also of arc-shape with its front edge spaced from the edge of the knife approximately in the same manner as the deflector plate 18. The throat plate 25 is adjustably mounted on the base plate 10 in the usual manner so as to permit it to be moved rearwardly as the diameter of the knife is reduced, due to wear and sharpening. The throat plate may be held in the base plate of the machine by means of screws 28 which extend through longitudinally extending grooves or slots 29 extending upwardly from the lower face of the base plate 10. Consequently, when the knife becomes reduced in diameter, the screws 28 can be loosened to permit the throat plate to be adjusted rearwardly, whereupon the screws are again tightened.

When this adjustment of the throat plate takes place, then the deflector or plow 19 will be correspondingly moved rearwardly and thus remain in the desired relation to the edge of the knife.

By means of the construction described it has been found that materials such as sponge or foam rubber can be easily and accurately cut. The difficulty previously experienced with the material being distorted by contact with the rotating surface of the knife is avoided because only a small sector of the material adjacent to the cutting edge of the knife is exposed to contact with the knife beyond the plows, and main area of the material cutting part of the rotating knife does not contact the material. The material is thus progressively cut by the exposed cutting edge and parted by the plows without distortion.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. In a cutting machine including a rotary knife, a base plate slidable under the material to be cut, a throat plate adjustably mounted on said base plate and straddling said knife, and a standard extending upwardly from said base plate and on which said knife is rotatably mounted, that improvement which includes a deflecting member mounted on said standard at one side of said knife and projecting from said standard forwardly into proximity to the outer edge of said knife, and another deflecting member secured to said throat plate and extending upwardly therefrom along the other side of said knife in proximity to the outer edge thereof, both of said deflecting members having their front edges bevelled and extending substantially concentric with the edge of the knife and deflecting material immediately after it has been cut, away from said knife in opposite directions therefrom.

2. In a cutting machine including a rotary knife, a base plate slidable under the material to be cut, and a standard extending upwardly from said base plate and on which said knife is rotatably mounted, that improvement which includes material deflecting members mounted in fixed relation to said cutting machine in close proximity and at opposite sides of that portion of said knife which cuts the material and spaced slightly in rear of said portion of the knife, said deflecting members moving the material immediately after it has been cut toward opposite sides of the knife out of contact therewith, and at throat plate secured to the base plate and straddling the lower portion of said knife, one of said deflecting members being mounted at its lower end on said throat plate.

References Cited in the file of this patent
UNITED STATES PATENTS

| | | |
|---|---|---|
| 702,788 | Gecynski | June 17, 1902 |
| 1,379,153 | Young | May 24, 1921 |
| 2,266,166 | Cohen | Dec. 16, 1941 |